… … … … US005603110A

United States Patent [19]
Heinzmann

[11] Patent Number: 5,603,110
[45] Date of Patent: Feb. 11, 1997

[54] PROCESS AND ARRANGEMENT FOR COMPENSATING ADJACENT-CHANNEL INTERFERENCE IN A DOUBLE-SIDEBAND AMPLITUDE MODULATION SYSTEM

[76] Inventor: Gustav Heinzmann, Zeulackerstr. 20, 6000 Frankfurt 60, Germany

[21] Appl. No.: 70,435

[22] PCT Filed: Nov. 28, 1991

[86] PCT No.: PCT/DE91/00929

§ 371 Date: Jun. 1, 1993

§ 102(e) Date: Jun. 1, 1993

[87] PCT Pub. No.: WO92/10039

PCT Pub. Date: Jun. 11, 1992

[30] Foreign Application Priority Data

Dec. 1, 1990 [DE] Germany .................... 40 38 405.5

[51] Int. Cl.$^6$ ........................................... H04B 1/06
[52] U.S. Cl. ............................................ 455/203; 455/296
[58] Field of Search ................... 455/46, 47, 48, 455/67.3, 202, 203, 204, 206, 207, 208, 209, 295, 296, 314, 315, 317, 310; 375/77, 42, 86, 120, 43, 74, 346, 277, 278, 265, 270, 777, 284, 209

[56] References Cited

U.S. PATENT DOCUMENTS 2,140,912 12/1938 Huber .
4,314,376 2/1982 Williams .................................. 455/310
4,691,375 9/1987 McGeehan et al. ....................... 455/47
4,992,747 2/1991 Myers ..................................... 455/206
5,179,589 1/1993 Nowicki .................................. 455/47

FOREIGN PATENT DOCUMENTS 504455 4/1939 United Kingdom .

OTHER PUBLICATIONS

"Eliminating Adjacent–Channel Interference," by Taylor, Wireless World, Jul. 1977, vol. 83 No. 1499.
"AM Receivers Without Interference", Illingworth, Wireless World, vol. 87, (1981) Oct., No., 1549.

Primary Examiner—Andrew Faile
Attorney, Agent, or Firm—Jansson & Shupe, Ltd.

[57] ABSTRACT

Disclosed is a procedure for filtering out the lower one of the upper other sideband of a double sideband oscillation consisting of a mix of several double sideband oscillations, the lower one and/or the upper other sideband of which is interfered with by the upper other, respectively the lower one by the upper other, respectively the lower one sideband turned toward it and partially overlapping, in telecommunication systems, in particular multi-channel telephone systems and short wave radio receivers. By means of mixing, demodulation and/or multiple mixing the interfering sidebands of the double sideband oscillation are brought into the frequency position of the interfered with sidebands and are canceled by adding with the opposite sign.

16 Claims, 7 Drawing Sheets

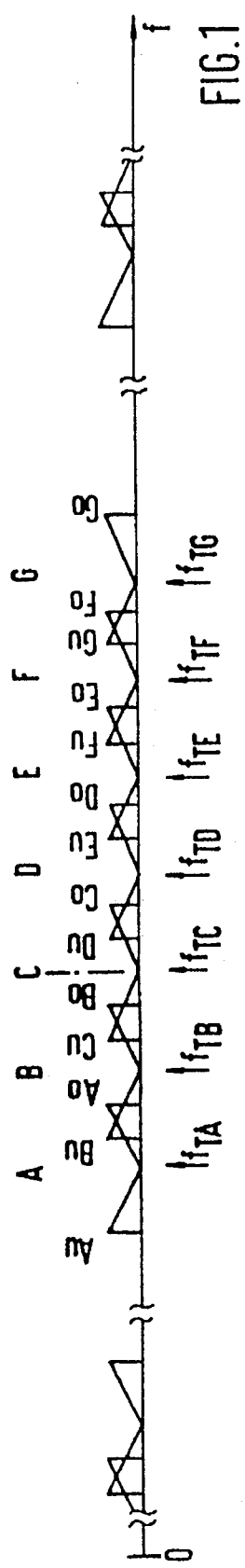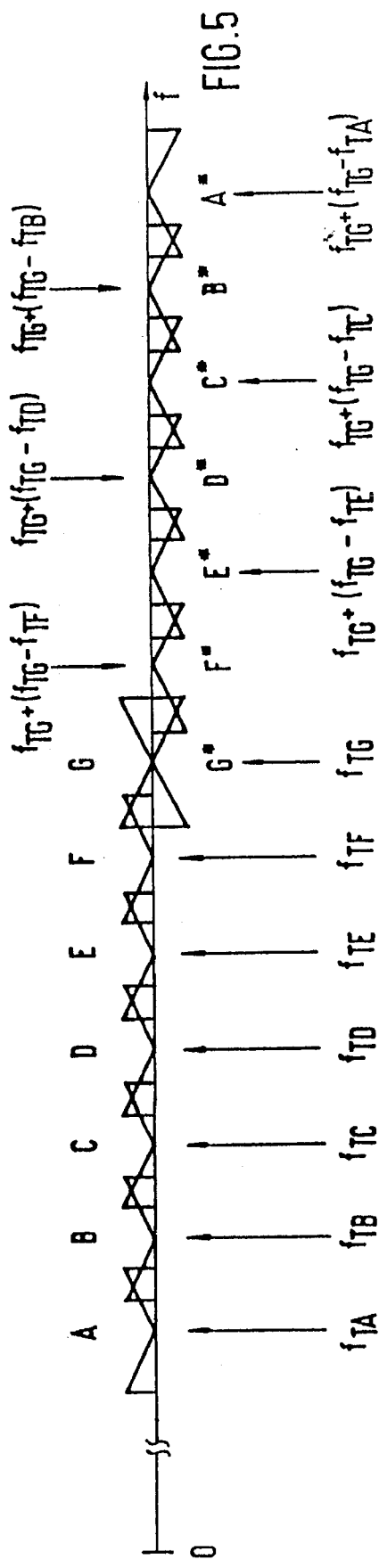

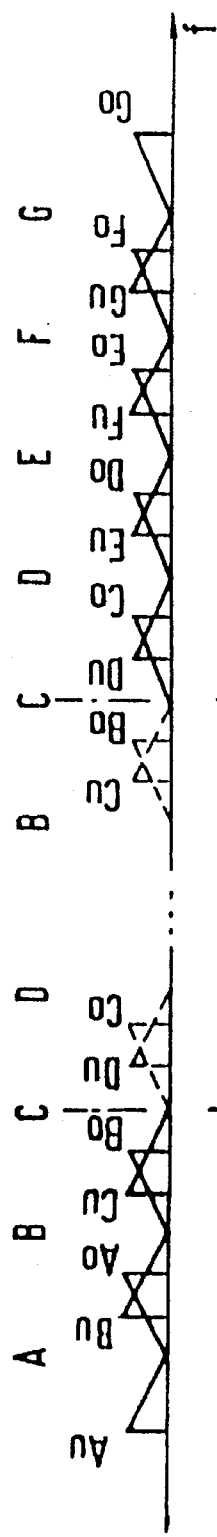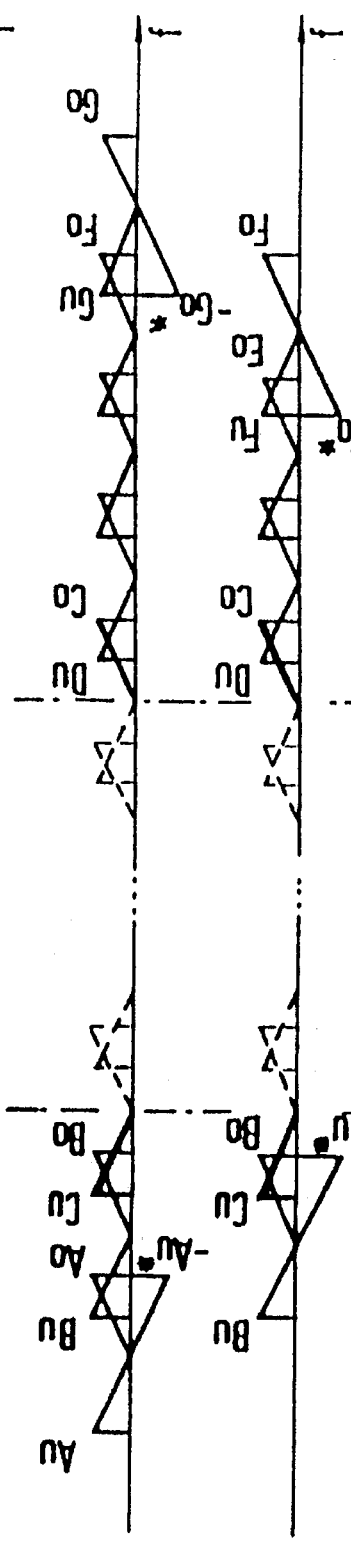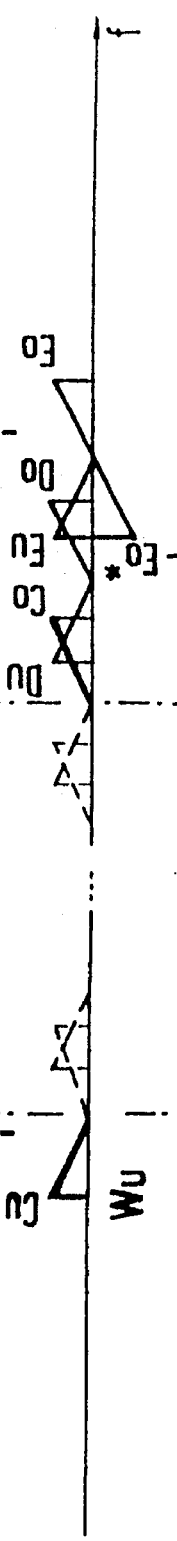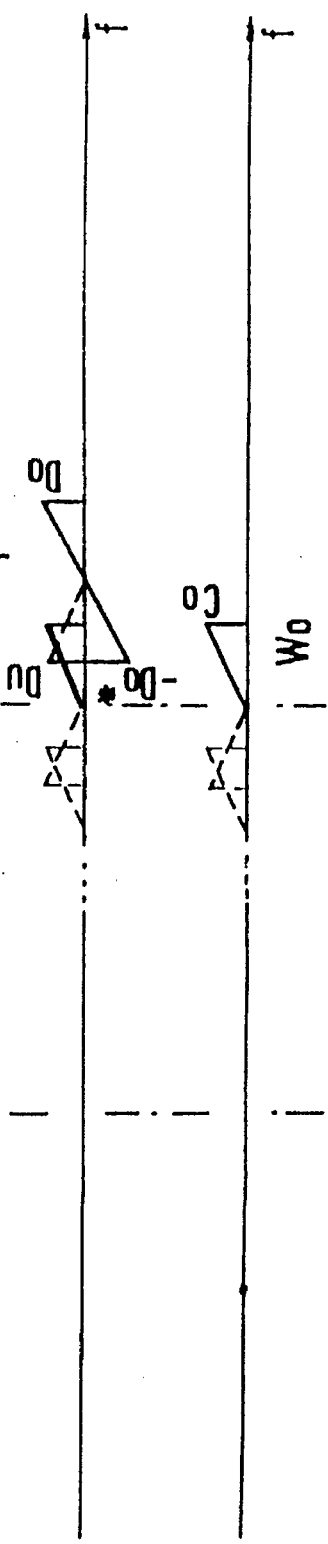

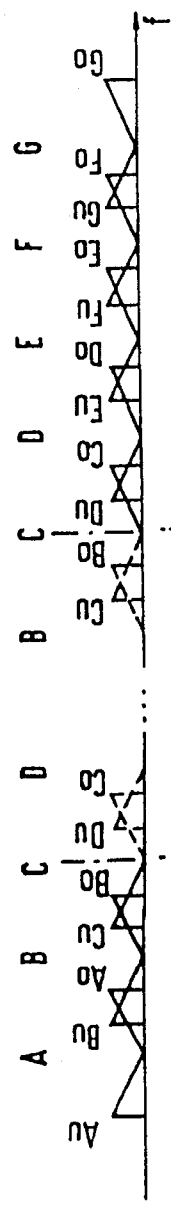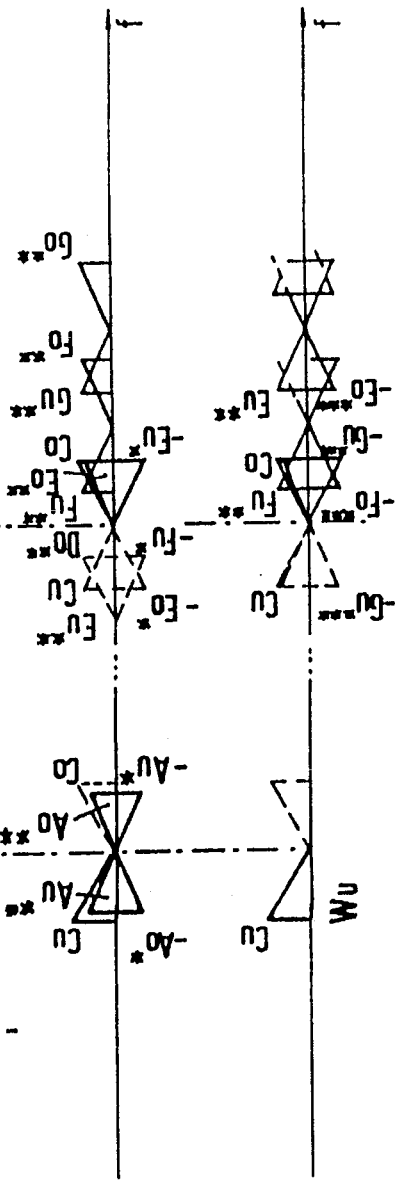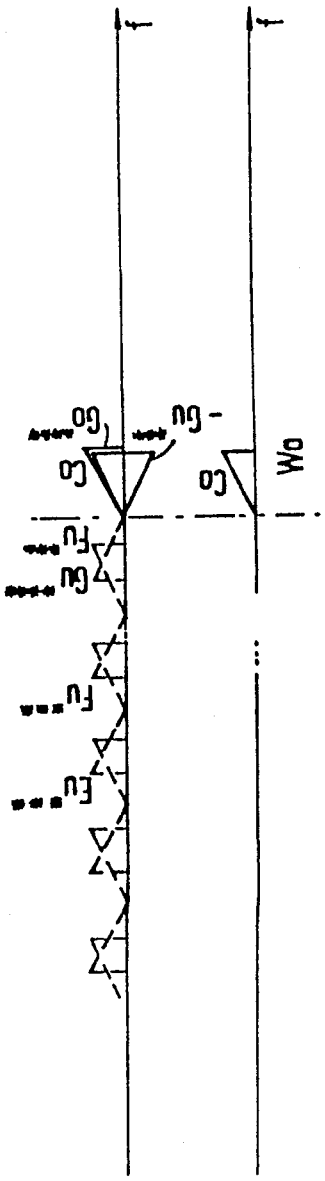

PROCESS AND ARRANGEMENT FOR COMPENSATING ADJACENT-CHANNEL INTERFERENCE IN A DOUBLE-SIDEBAND AMPLITUDE MODULATION SYSTEM

FIELD OF THE INVENTION

The invention relates generally to double-sideband telecommunication signals and, more particularly, to interference elimination in such signals.

BACKGROUND OF THE INVENTION

It is known in principle that low frequency base signals of several origins can be converted into higher frequency signals by means of carrier frequencies. Such higher frequency signals can be transmitted via a common transmission path (either wire or wireless) in the form of a wide band transmission line or as a frequency band of a radio transmission.

With signals so converted, a mix of the higher frequency signals occurs in the transmission path. At the end of the transmission path, each individual higher frequency signal must be filtered out before it can again be converted (by means of the carrier frequency allocated to it) into the original low-frequency base signal. Such processes have to take place without substantially impairing the "intelligibility" of the signal and without significant "cross talk" between the individual channels.

During conversion, two sidebands of the same channel are created (a lower and an upper sideband), one each on either side of the carrier frequency. Either or both sidebands can be transmitted. And the carrier itself can be transmitted or such carrier can be suppressed on the transmission side. When suppressed, a new carrier of the same frequency has to be re-created at the receiving side, in order to re-convert the respective signal into the low-frequency base signal.

The aforementioned single-sideband transmission has been proven to be successful in utilizing the full "width" of the available transmission band of the common transmission path and yet spacing the channels as closely as possible, thereby obtaining as many channels as possible in the available band. However, it requires higher expenditure for high quality filtering circuits at the end of the transmission path, in order to filter out the only sideband and to regain the original base signal without loss of information. In addition and in the case of single-sideband reception, the demodulation of the signal cannot be performed through simple rectification, as in the case of double-sideband oscillations. Rather, demodulation is by multiplying the high-frequency signal and the intermediate-frequency signal by an oscillation, the frequency of which must be exactly equal to the frequency of the carrier.

The technology involved in double-sideband receivers, which is comparatively simple, is believed to be the reason why single-sideband technology has not found favor for use with the internationally-recognized wave plans, especially in the area of short, medium and long wave radio transmission. Moreover, the double-sideband transmission often has an advantage for the owners of single-sideband receivers. If one sideband is subject to interference from an adjacent signal, the receiver user can switch reception to the other sideband, providing the latter is substantially interference-free. This is sometimes referred to as diversity reception. Therefore, double-sideband transmission arrangements continue to exist.

However, compared to the conditions in the case of single-sideband transmission, there is a requirement to reduce the number of channels in the frequency band of the transmission path in half or to narrow the individual channels with regard to their low-frequency band width. If, however, the same number of channels (such number often being the same as with single-sideband transmission at nearly equal band width) is transmitted, there will almost certainly be overlapping of those sidebands of two double-sideband oscillations which are adjacent to one another. That is, the upper sideband of one oscillating channel will overlap and interfere with the lower sideband of the next-higher oscillating channel of different origin.

With such two channels of different origin, it is not possible (or at least not easy) when receiving the signals to filter out at least one of the sidebands from the "mix" of overlapping sidebands. As a consequence, when the allocated carrier is added according to the principle of single-sideband reception, such reception is not substantially free of interference. Re-conversion into the desired basis signal is, at the least, very difficult.

With regard to the state of technology concerning the cancellation of interfering signals, reference is made to the following publications. German patent document DE 22 33 614 A1 depicts a circuit arrangement for the reduction of the interference output in code multiplex transmission devices. In a receiver for code-multiplex signals, interfering, non-orthogonal signals by other transmission stations are selected and subtracted from the composite signal mixture by using the "not code pattern of the desired transmitter" feature.

German patent document DE 28 52 127 A1 depicts a device for the suppression of an undesirable signal. In a receiver, vestigial-sideband modulated signals (e.g., in a TV set) and interfering signals, offset in time but of the same type (such as echo signals), are expediently selected and subtracted from the composite signal mixture by using the feature "not first signal in time."

German patent document DE 26 22 058 A1 depicts a procedure for eliminating intelligible cross-talk during the transmission of information through transformation of amplitude and frequency modulation by means of frequency modulation frequency division multiplex or FM-FDM. In a receiver for frequency modulated signals (in the context of an FM-FDM transmission system), the interference signals "intelligible cross-talk" which appear "downstream" of the frequency demodulator are created a second time at the receiving end. This is by a special amplitude demodulator which is connected in parallel with the actual frequency demodulator. The interference signals are then subtracted from the output signal of the frequency demodulator.

The technology of the aforementioned German patent documents shares some commonality. Interfering signals are eliminated through subtraction of the selected or reproduced interfering signal. However, such technology does not involve overlapping sidebands of adjacent transmitters. The procedures described in such documents is not suitable for canceling interfering, overlapping sidebands.

Another document which deals with the cancellation of interfering signals is an article by P. L. Taylor titled "Eliminating Adjacent-Channel Interference" published in *Wireless World*, vol. 83, No. 1499, July 1977, pages 55 to 57. The article describes the following situation. There are a desired signal in the form of a double-sideband oscillation and an interference signal in the form of a double-sideband oscillation. The carrier oscillations of the two double-sideband oscillations are so close in their frequencies that the sidebands not only overlap each other, they extend beyond the carrier of the respective other double-sideband oscillation. Both outer companion sidebands must be free of interference; as such, they must not be interfered with by an overlapping signal on the upper or on the lower side. The article mentions two procedures to eliminate the interfering signal.

In the first procedure, the sum of the desired signal and the interfering signal is product-demodulated with an oscillation with respect to which the frequency and the phase of the carrier oscillation of the desired signal must coincide exactly. The result is that the demodulated base band of the desired transmitter is heterodyned by an interfering double-sideband oscillation, the frequency-converted carrier oscillation of which together with the two sidebands come to be located, in an interfering manner, in the demodulated base band of the desired transmitter. The frequency-converted carrier frequency of the interfering signal is equal to the difference of the "carrier frequency of the interfering signal minus carrier frequency" of the desired signal.

That part of the lower sideband of the lower frequency interfering oscillation, which becomes mathematically negative during demodulation, appears—reflected at frequency zero—from zero on upwards. For reasons of clarity it should be stated that the demodulated base band of the desired transmitter—as is the case with every synchronous demodulation—represents the in-phase sum of the two equal sidebands of the desired signal that add up to be positive. This base band is now interferingly heterodyned by the described double-sideband oscillation with the reflected part. Freeing the demodulated base band from the latter is the purpose upon which the first procedure described by Taylor is based.

The task is solved in such a way that, in a second signal path, the original sum of the desired signal and the interference signal is, firstly, product-demodulated with the carrier of the desired transmitter, phase-shifted by 90°, whereby—as is known from quadrature modulation systems—the desired signal is canceled and the interfering signal remains. Subsequently, the interfering signal is multiplied by a special square-wave oscillation in a manner such that the mentioned double-sideband oscillation with the reflected part is achieved. It is then subtracted from the disturbed demodulated base band of the first signal path.

To put it another way, the characteristic of the procedure according to Taylor consists of the design and creation of the special rectangular function, whereby the reflected part is obtained with the correct phase and sign. In the case of plain multiplication with a sine wave or a normal rectangular function, this would not be true.

The procedure always works with complete double-sideband oscillations. From this it follows that, as already expressed above, in the first procedure described by Taylor, the interfering signal which is to be canceled must not only be a complete double-sideband oscillation, but must itself not be interfered with by another interfering signal on one of its sidebands.

According to the second procedure described by Taylor, the sum of the desired signal and interfering signal is product-demodulated with the carrier oscillation of the interfering signal which is phase-shifted by 90°. Thereby, the interfering signal is canceled. Because the demodulation products of the upper and the lower sideband are then two base bands with opposite signs, they cancel each other out. (This technique is also known in quadrature modulation systems.) That which remains is the frequency-converted desired signal. However, such desired signal remains with a carrier frequency which is equal to the difference of the carrier frequency of the interfering signal minus the carrier frequency of the desired signal.

This double-sideband oscillation also contains a reflected part. Therefore, a normal demodulation is not possible. In this case as well, this is accomplished by a special rectangular oscillation with which multiplication is performed for the purpose of demodulation. In principle, it is the same as in the first procedure but involves a symmetrical function in relation to the ordinate axis, whereas the rectangular function of the first procedure was obliquely symmetrical in relation to the zero point. Also for the second procedure described by Taylor, the interfering signal must not be interfered with by another signal on any of its sidebands. The procedures described by Taylor take into consideration only the case of a single interfering signal.

OBJECTS OF THE INVENTION

It is an object of the invention to provide a method and apparatus overcoming some of the problems and shortcomings of the prior art.

Another object of the invention is to provide a method and apparatus for providing substantially interference-free sideband signals in transmissions involving interference from an adjacent sideband.

Yet another object of the invention is to provide a method and apparatus for providing substantially interference-free sideband signals in transmissions involving interference from an adjacent sideband in instances where interfering adjacent sidebands do not extend to the carrier of the adjacent signal.

Still another object of the invention is to provide a method and apparatus for providing substantially interference-free sideband signals involving amplitude modulation and differing forms of frequency modulation.

Another object of the invention is to provide a method and apparatus for providing substantially interference-free sideband signals which can be applied to signals which are electro-magnetically radiated or carried over a conductor.

Another object of the invention is to provide a method and apparatus for providing substantially interference-free sideband signals which can be applied to signals having carriers which are closely spaced in frequency.

How these and other objects are accomplished will become more apparent from the following descriptions and from the drawings.

SUMMARY OF THE INVENTION

A fundamental principle of the invention is that if a sideband, e.g., the upper sideband of a signal (an "oscillation") interferes with a sideband, e.g., the lower sideband, of an adjacent signal, the interfering sideband is canceled by its companion sideband, the latter being of opposite polarity or algebraic sign. The invention is useful particularly in the case of an "ensemble" of double-sideband oscillations that overlap each other.

As used in this specification, an "ensemble" means a series of frequency-adjacent double-sideband oscillations overlapping each other in such a way that no sideband reaches to the carrier frequency of any other double-sideband oscillation. It is an intrinsic feature of an ensemble that it has two ends, one end at a lower frequency and another end at a higher frequency, and that the double-sideband oscillation at each end has an outermost sideband which is free of interference.

According to the invention, the outermost double-sideband oscillation of an ensemble can be canceled by reflecting the outermost double-sideband oscillation at its carrier frequency and adding it to the ensemble with the same magnitude but with the opposite sign. This procedure can be continued up to (or down to, as the case may be) and including the adjacent double-sideband oscillation of the signal which is desired to be received. The procedure ends with canceling the adjacent double-sideband oscillation of the desired signal. Thus, the desired signal can be received interference-free by single-sideband reception.

The aforementioned procedure can be carried out by what may be termed a "step-by-step" method, i.e., either by starting from the upper end of the ensemble or from the lower end of the ensemble. In the alternative, the procedure can be carried out by starting from both ends and in that way, the signal can be received by double-sideband reception. In the step-by-step method, the anti-interference compensation consists in using "reflections" of sidebands.

Other aspects of the invention involve what may be termed a "simultaneous" method. In the simultaneous method, in principle the same steps all are executed as described above but such steps are executed simultaneously instead of in sequence. The simultaneous method is carried out by using reflections in part and by using conversions by a certain frequency difference.

An example will illustrate the principle of the simultaneous method. It is assumed that there are five double-sideband oscillations C, D, E, F and G and that there is partial overlap of at least one sideband of an oscillation with a sideband of another oscillation. It is also assumed that (a) one sideband of the C oscillation is the signal which is desired to be received and (b) the outermost sideband of the G oscillation is free from interference.

A substantially interference-free sideband of the C oscillation can be obtained by simultaneously adding the ensemble (C+D+E+F+G) minus the ensemble reflected at the carrier of D, minus the ensemble reflected at the carrier of F, plus the ensemble converted by such a frequency that the reflected sideband of E is superposed with and eliminated by the converted sideband of E, plus the ensemble converted by such a frequency that the reflected sideband of G is superposed with and eliminated by the converted sideband of G.

The methods described above make it possible to receive, by single-sideband reception, either sideband of a desired signal or to receive both sidebands of the desired signal by double-sideband reception.

The step-by-step method may be carried out by any one of three different circuit arrangements which are identified in the drawing as FIGS. 4, 6 and 7. A common feature of such circuit arrangements involves using mixers to reflect the double-sideband oscillations needed for compensation at their carrier frequencies. Such mixers multiply the mixture of oscillations by an oscillation having the double frequency of the carrier.

In the first circuit arrangement shown in FIG. 4, the mixer provides the reflected double-sideband oscillation needed for the compensation of each step of compensation. Additionally, the compensation itself also takes place in the same mixer. This way is advantageous since the compensation is independent of fluctuations in the carrier amplitude. (If a series of mixers were used, the procedure may result in some noise being produced.)

In the second circuit arrangement shown in FIG. 6, each step of compensation takes place in a respective summation point. This arrangement results in low noise and cost. (Depending upon the circuitry of the receiver, it may be necessary to provide constant-amplitude stabilizers for the carriers to be squared and used for the reflection procedure.)

In the third circuit arrangement shown in FIG. 7, each step of compensation also takes place in a respective summation point but prior to summation, an automatic regulator is provided for obtaining a compensation, the error of which is exactly zero. This arrangement provides extremely precise interference-suppressing compensation and a low noise level The invention is now explained in more detail by means of the exemplary embodiments shown in the drawing.

BRIEF DESCRIPTION OF THE DRAWINGS

FIG. 1 shows the make-up of a so-called ensemble of several double-sideband oscillations, within a high frequency transmission band, the carrier frequencies of which are adjacent to each other. Those sidebands of adjacent oscillations which are "turned toward" each other, i.e., which are adjacent to one another, at least partially overlap and the sidebands at the upper and lower ends of the ensemble, i.e., those turned away from the ensemble, are substantially free of interference.

FIG. 2 shows the successive individual compensation steps occurring while filtering out the lower as well as the upper sideband of a double-sideband oscillation within the ensemble shown in FIG. 1. FIG. 2A shows the double-sideband oscillations A to G in one group to the right and in one group to the left, partly in repetition, to illustrate, as in the steps described below, two different ways of interference suppression compensation according to FIGS. 2B through 2F.

FIG. 3 shows individual compensation steps taking place simultaneously when filtering out the lower as well as the upper sideband of a double sideband oscillation within an ensemble as shown in FIG. 1. In FIG. 3A, the double-sideband oscillations A to G are shown in one group to the right and one group to the left, in part repeatedly, to illustrate, as in the steps described below, two different ways of the interference suppression compensation according to FIGS. 3B to 3F.

FIG. 5 shows the ways of compensation of an interfering double-sideband oscillation after passing through a mixer of the circuit apparatus shown in FIG. 4.

DETAILED DESCRIPTION OF THE PREFERRED EMBODIMENT

Figure 4:
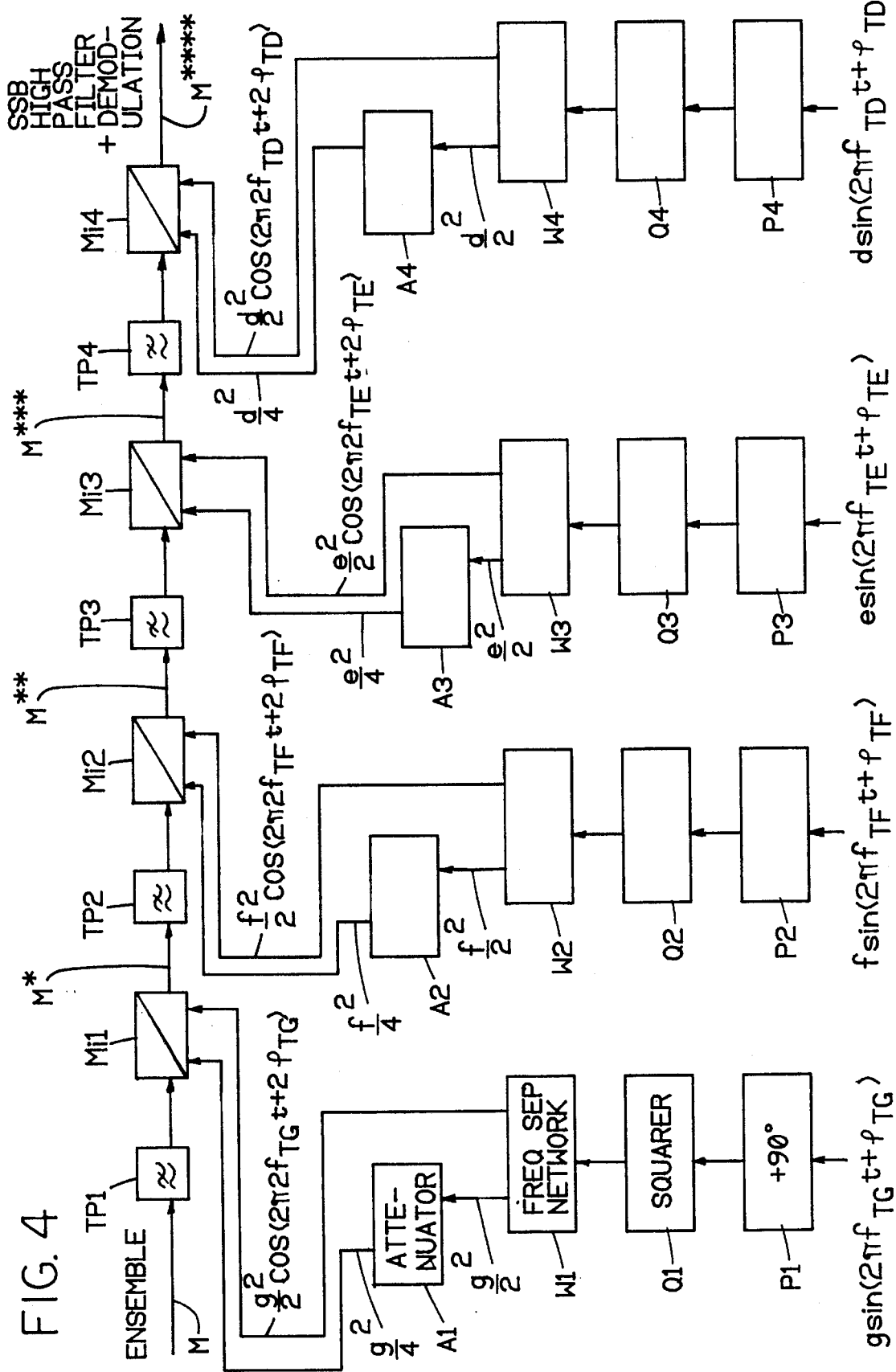
FIG. 4 shows a circuit apparatus used to carry out the inventive method.
Figure 6:
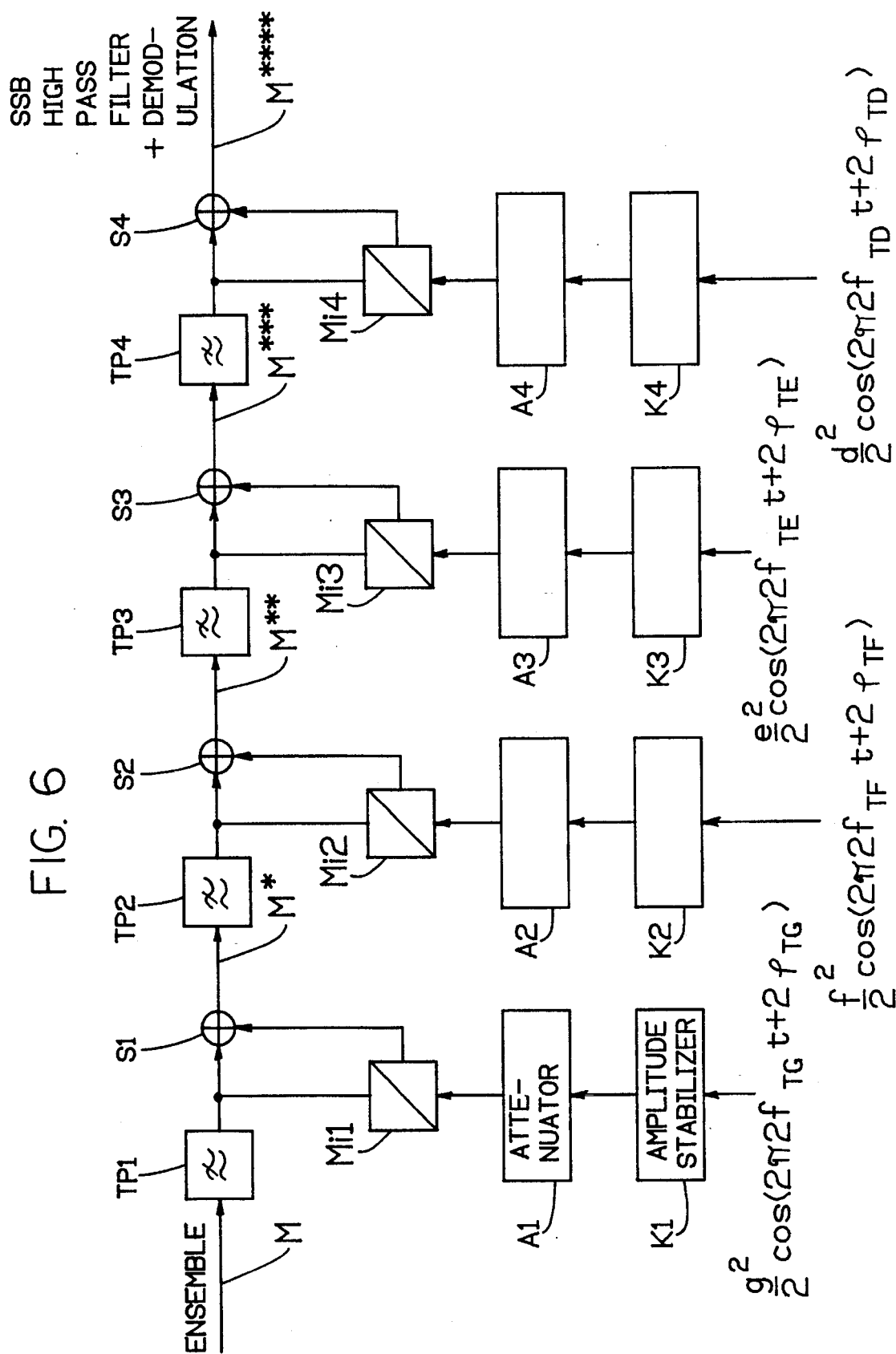
FIG. 6 shows another circuit apparatus for carrying out the inventive method featured here in suppressed noise.
Figure 7:
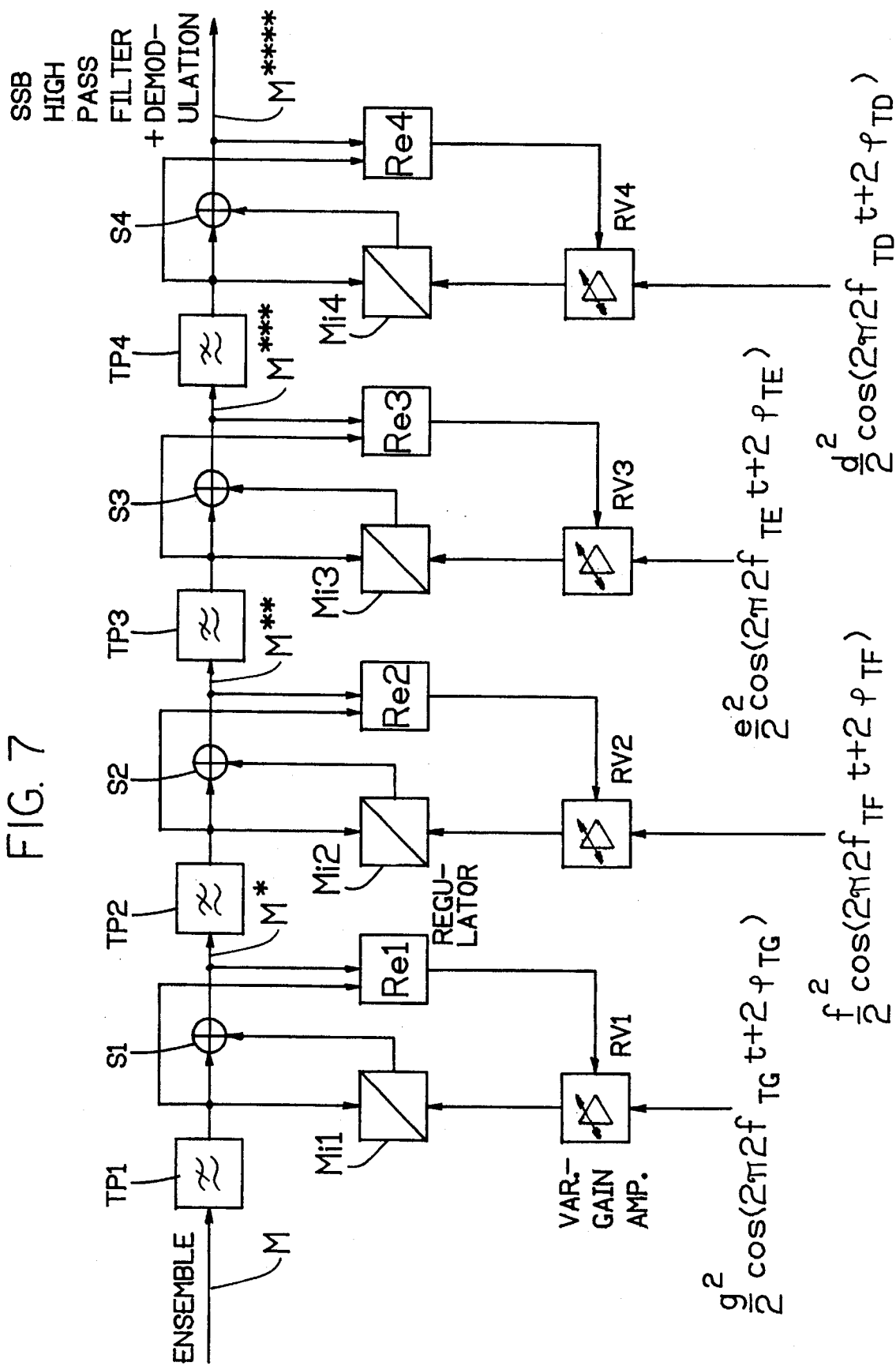
FIG. 7 shows a further circuit apparatus for carrying out the inventive method and featuring regulators to achieve an even better interference suppression compensation combined with noise suppressed to a large degree.
Figure 8:
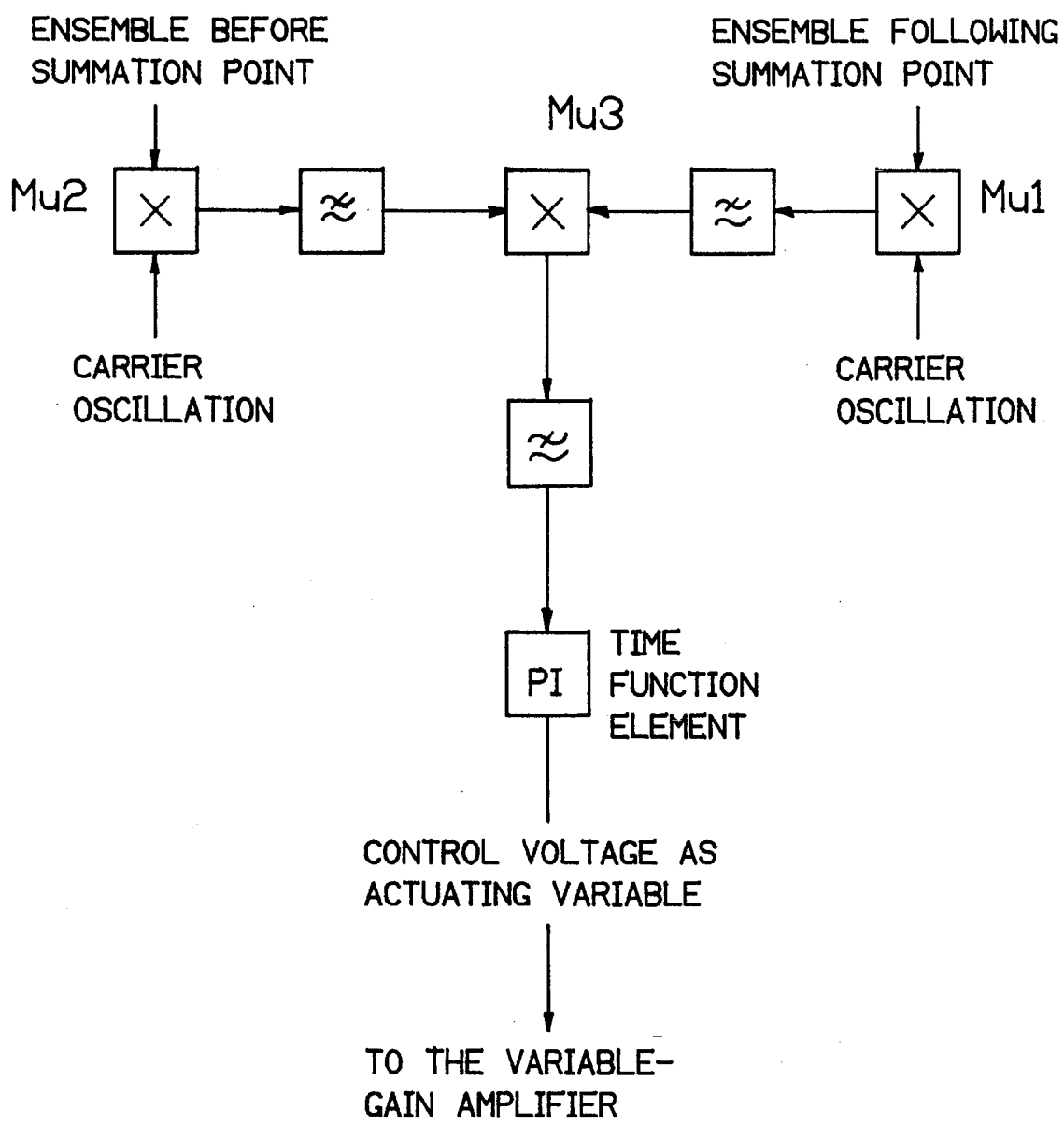
FIG. 8 shows the make-up of a regulator which can be used in the circuit apparatus of FIG. 7.

Before describing the invention, some preliminary comments will be helpful. The briefly-stated principle of the invention involves two or more double-sideband oscillations making up an "ensemble" of oscillations. It further involves situations where a sideband (the upper sideband, for example) of one of such oscillations overlaps with (and thus interferes with) an adjacent sideband (the lower sideband, for example) of the oscillation relating to the next-higher carrier frequency in the ensemble. An advantage of the invention is that at least one of the transmitted sidebands is received with so little interference that an extremely good evaluation of the signal, either radio or "conductor-borne" is possible and full information can be obtained from such signal.

In general, the method is carried out by canceling the interfering sideband of an adjacent oscillation using the other sideband of such oscillation. Principally, it is advantageous to evaluate only the sideband with the least residual interferences according to the principle of single sideband reception, since the evaluation of two sidebands affected differently with residual interferences according to the double-sideband reception must lead to more evaluation errors. Further, it will become apparent from the following description of the method that the overlapping of a sideband can reach to but not extend beyond the middle of the adjacent double-sideband oscillations.

The invention offers a unique solution to the problem of reception of oscillation signals from two or more double-sideband modulated short-wave transmitters, the carrier frequencies of which are often so close together that the sidebands turned to each other overlap. The consequence is that one tends to be forced, in order to have reception with little interference, to receive using a small band width. This has the disadvantage that the higher frequencies of the sound frequency spectrum are cut off.

Prior to the introduction of the Geneva wave plan, the same deficiency was also prevalent in the medium and long wave range. It exist in those ranges even today if individual transmitting stations are not disciplined and send a modulation band which is wider than the internationally agreed-upon band width of 9 kHz.

The invention is not only suitable for amplitude modulation but also for other forms of modulation, and is always suitable if there is an upper and a lower sideband and the two sidebands are symmetrical to each other. It is suitable for signals from transmitters with frequency modulation (phase modulation, angle modulation), if their modulation band can be presented by two sidebands, set up in the same manner, and which are symmetrical to each other.

Further, the invention is not only for radio transmission, but also for transmission by a conductor, e.g., a wire. It could also be used for a carrier frequency technology which would work with a double-sideband modulation with two overlapping sidebands instead of single-sideband modulation with sidebands separated from each other. The invention is not dependent on the physical nature of the carrier. Because of this high degree of universality of the invention, the broad term "oscillations" is used herein.

The term "ensemble" plays a special role in the invention and refers to a series of frequency-adjacent, overlapping double-sideband oscillations which are characterized by two properties, namely:

1. The outermost sidebands at the ends of the ensemble are not disturbed by interference;
2. The overlappings of sidebands within the ensemble may reach, at a maximum, to the carrier frequency of the adjacent double-sideband oscillation or if there is no carrier, to the frequency to which the sidebands are arranged symmetrically.

By way of contrast an "ensemble" does not cover an entire "official" band such as the 49 meter band. Rather, as viewed in the direction of ascending frequencies, an ensemble begins with the first transmitter the lower sideband of which is toward the low side of the ensemble and free of interference. The ensemble ends with the transmitter, the upper sideband of which is toward the upper side of the ensemble and is also free of interference.

This is an example of the progress made possible by the invention. Transmitters, the transmitted double-sideband oscillations of which overlap each other (which can be received without interference only via narrow band using known means) can now, by virtue of the invention, be received without interference and with their full frequency band so long as the double-sideband oscillations of the transmitter together form such an ensemble. "To receive with their full frequency band" means that the base band, with which the carrier frequency of the desired transmitter was originally modulated, is transmitted to the demodulator of the receiver without being narrowed.

In the "convention" used herein, the suffix "U" refers to the lower sideband and the suffix "O" to the upper sideband. Referring to the ensemble shown in FIG. 1, it includes the double-sideband oscillations A to G, the sidebands Ao and Bu to Fo and Gu of which are turned toward each other and overlap in pairs. None of the sidebands of one of the double-sideband oscillations B to F to be evaluated can be received without interference; only the outer sidebands Au and Go are free of interference and can be used for the evaluation of the sideband oscillations A or G.

Besides the ensemble shown, there may be other double-sideband oscillations, the sidebands of which, however, do not overlap the sidebands Au and/or Go and which, therefore, are immaterial to the invention. The overlap is shown here only as a partial overlap for better clarity. Such overlap can reach to the middle of the double-sideband oscillation and, therefore, to its carrier frequency. However, it must not extend beyond this middle, since otherwise the invention cannot be used, as will be seen from the considerations below.

For reasons of simplicity, uniform carrier frequency spacings (horizontally along axis f) are shown in FIG. 1. And it should also be appreciated that the vertical arrows identified as "fTA" and so forth identify the location of the "center" or carrier frequency related to that signal having sidebands Au, Ao and so forth. It may be helpful to consider that while the oscillations A–G are spaced horizontally along the axis f, the direction of signal transmission is vertically upward.

The following statements, however, are also valid for non-uniform carrier frequency spacings. The transmitter with a sideband free of interference to be used for the procedure can—as seen from the station being received—be several neighbouring channels lower than the desired station for reception; it may also be several neighbouring channels higher. In this case, one has the choice of selection.

In general one will select, as the start, that interference free sideband of the ensemble which requires the smallest number of conversions up to the desired transmitter. As an example, if one wishes to evaluate or detect for information purposes the "C" oscillation, one will select the nearer interference-free sideband Au for conversions rather than the further interference-free sideband Go since using the latter will require more conversions.

In the following analyses, the desired transmitter, i.e., the double-sideband oscillation one wants to make substantially interference-free and receive, is generally designated with W as in FIGS. 2D and 2F. Wu is its lower sideband, and Wo is its upper sideband.

In the left part of FIG. 2, a first procedure will be seen showing the location of the lower sideband Wu of the double-sideband oscillation W (which corresponds to the double-sideband oscillation C of FIG. 1) in the ensemble. The right side of FIG. 2 shows the relative location of the undisturbed upper sideband Go. According to the method, one may obtain the "clean" lower sideband Wu (corresponding to Cu) with few conversions or the "clean" upper sideband Wo (corresponding to Co) with a greater number of conversions. The transmitter with the interference free sideband, whether at the lower end or at the upper end of the ensemble, does not play a decisive role in the method according to the invention.

In the first example where the double-sideband oscillation desired to be received is to be W=C, the transmitter A with an undisturbed or interference-free lower sideband is once removed from the next one in the direction of lower frequencies. On the other hand, the transmitter G with an interference-free upper sideband is the fourth removed in the direction of higher frequencies. Therefore, two possibilities exist, either to filter out the lower sideband Wu or the upper sideband Wo.

(a) Filtering Out the Lower Sideband Wu
(see left part of FIG. 2)

In this case, the undisturbed lower sideband Au in FIG. 2A is converted through mixing by means of a suitable carrier and changing the polarity (sign) into the frequency position of the interfering upper sideband Ao, and is algebraically added to the sidebands Bu+Ao interfering with each other as sideband −Au* in FIG. 2B. The result is the now largely interference-free sideband Bu in FIG. 2C (first compensation). In order to get the still interfered with lower sideband Cu as a filtered lower sideband Wu, the lower sideband Bu (now largely interference free) is converted, through mixing by means of another suitable carrier, again with a change of polarity (sign), into the frequency position of the interfering upper sideband Bo. It is then subtracted as sideband −Bu. in FIG. 2C from the sidebands Cu+Bo which are interfering with each other. The result is the now largely interference-free lower sideband Cu in FIG. 2D (second compensation). This is already the lower sideband Wu to be filtered out of the double-sideband oscillation W which is to be evaluated, and which can now be evaluated according to conventional principles of single-sideband reception involving demodulation.

(b) Filtering Out the Upper Sideband Wo
(see right part of FIG. 2)

In this case, the interference-free upper sideband Go in FIG. 2A is converted, through mixing, by means of a suitable carrier with changing the polarity (sign) into the frequency position of the interfering lower sideband Gu. It is then algebraically added as sideband −Go, in FIG. 2B from the sidebands Fo+Gu interfering with each other. The result is the now largely interference-free lower sideband Fo in FIG. 2C (first compensation).

This now largely interference-free upper sideband Fo is converted, through mixing by means of another suitable carrier and changing the polarity (sign) into the frequency position of the interfering lower sideband Fu. It is then subtracted as the sideband −Fo* in FIG. 2C from the sidebands Eo+Fu in FIG. 2D which interfere with each other. The result is the now largely interference-free upper sideband Eo in FIG. 2D (second compensation).

This now largely interference-free upper sideband Eo is converted, through mixing by means of another suitable carrier and changing the polarity (sign) into the frequency position of the interfering lower sideband Eu and subtracted as sideband −Eo* in FIG. 2D from the sidebands Do+Eu which interfere with each other. The result is the now largely interference free upper sideband Do in FIG. 2E (third compensation).

In order to obtain the still-interfered-with upper sideband Co as the filtered upper sideband Co, the now largely interference-free upper sideband Do is converted through mixing by means of another suitable carrier and change of polarity (sign) into the frequency position of the interfering lower sideband Du. It is then subtracted as sideband −Do* in FIG. 2E from the sidebands Co+Du which interfere with each other. The result is now the largely interference-free upper sideband Co in FIG. 2F (fourth compensation). This is the upper sideband Wo, to be filtered, of the double-sideband oscillation W to be evaluated, which can now be evaluated conventionally according to the principle of single sideband reception (demodulation). In the case of filtering both sidebands Wu and Wo of the double-sideband oscillation W, they can also be evaluated according to the principle of double-sideband reception (demodulation).

In FIG. 3 a second procedure can be seen showing how the lower sideband Wu or the upper sideband Wo of the double-sideband oscillation W (in this case, interfered with on both sides by the adjacent double-sideband oscillations of the double-sideband oscillation C from FIG. 1), can be filtered in the ensemble to be largely free of interference. As shown in the left part of FIG. 3, this occurs in the ensemble part between the lower end of the interference-free lower sideband Au and, on the carrier side, the beginning of the interfered with lower sideband Wu=Cu, or (shown in the right part of FIG. 3) in the ensemble part between the upper end of the interference-free upper sideband Go and the beginning, at the carrier side, of the upper sideband Wo=Co.

Before describing this second procedure, its individual steps should be gone over in a mental experiment. Imagine that a non-automated short-wave receiver is to be operated. First the desired station is selected with the tuning knob. This receiver, however, proves to be interfered with by the lower sideband of the transmitter with next higher frequency as well as by the upper sideband of the transmitter with the next lower frequency.

Turning the tuning knob to the right and left shows that the other frequency-adjacent transmitters of higher and lower frequencies also more or less overlap each other with their sidebands. Thereupon, one cancels the lower sideband of the transmitter with the higher frequency interfering with the desired station with its upper sideband.

As the first trial has already shown, when the tuning knob was turned to the right and to the left, this upper sideband of the interfering transmitter, which was to be used for the cancellation was, however, interfered with; in the present example, by the lower sideband of the once removed from the next transmitter with a higher frequency. If this is used for the cancellation, the first interfering transmitter is eliminated, however, at the same time the interference of the interfered with second neighbouring transmitter is pulled in as well.

But one does not stop here and one cancels this interfering sideband with its allocated upper sideband. But this sideband is interfered with as well, in this case by the lower sideband of the second removed from the next frequency-higher transmitter. One also cancels this sideband with the upper sideband of the second removed from the next frequency-higher transmitter. But this sideband proves to be interfered with as well by the lower sideband of the third removed from the next transmitter. Now, one cancels this interfering sideband with the upper sideband of the third removed from the next transmitter. This proves to be interference free. The cancellation of the interference is successful. Now, one is at the end of the ensemble.

One could be satisfied at this point. However, it is assumed that residual interferences by incomplete cancellations are found. Therefore, the attempt is made to make cancellations on the other side, i.e., in the frequency band, the frequencies of which are smaller than the carrier frequency of our desired transmitter. Theoretically—if past experience were not at hand from the first examination—one could, of course, be fortunate with merely single sideband reception of the lower sideband of the desired transmitter. But it is assumed that this is not the case because it causes interference in the upper sideband of the next transmitter with the lower frequency. Cancellation occurs with its other sideband, its lower side band. And in the present example, it is assumed that this is interference free: that is, where the ensemble starts as seen from this vantage point. In this way one continues with this single, necessary cancellation at the lower frequency side of the assumed transmitter.

This procedure offers two possibilities as well: to filter either the lower sideband Wu or the upper sideband Wo.

The following is the description of this second procedure by means of FIG. 3, whereby in contrast to the mental experiment one begins with the simpler case:

(a) Filtering Out the Lower Sideband Wu (see left part of FIG. 3)

In this case the lower sideband Bu which is itself interfered with, including the interfering upper sideband Ao in FIG. 3A, is converted, through mixing by means of a suitable carrier and a change of polarity (sign), into the frequency position of the interfering upper sideband Bo and subtracted, as sideband $-Ao^*-Bu^*$ from the sidebands Cu+Bo in FIG. 3B. The result is a lower sideband Cu in FIG. 3C which is interfered with by the sideband $-Ao^*$ (first compensation).

At the same time, however, the lower sideband Au in FIG. 3A is also converted through mixing by means of another suitable carrier without changing the polarity (sign) into the frequency position of the interfering sideband $-Ao^*$. This positive sideband $Ao^{**}$ in FIG. 3C is then heterodyned with the sideband $-Ao^*$ with the negative sign, with the consequence that $Au^{**}$ and $-Ao^*$ cancel each other.

The result is the now largely uninterfered with lower sideband Cu in FIG. 3D (second compensation). This is already the lower sideband Wu to be filtered, of the double-sideband oscillation W, which can now be evaluated according to the principle of single sideband reception (demodulation).

(b) Filtering Out the Upper Sideband Wo (see right part of FIG. 3)

In this case the upper sideband Do which is interfered with, including the interfering lower sideband Eu in FIG. 3A, is converted, through mixing by means of a suitable carrier and a change of polarity (sign), into the frequency position of the interfering lower sideband Eu and subtracted, as sideband $-Do^*-Eu^*$ from the sidebands Co+Du in FIG. 3B. The result is an upper sideband Co in FIG. 3C which is interfered with by the upper sideband $-Eu^*$ (first compensation).

At the same time, however, the upper sideband Eo in FIG. 3A, which is itself interfered with, is also converted through mixing by means of another suitable carrier without changing the polarity (sign) into the frequency position of the disturbing sideband $-Eu^*$. This positive sideband $Eo^{}+Fu^{}$ in FIG. 3C is then heterodyned with the sideband $-Eu^*$ with the negative sign. The result is an upper sideband Co in FIG. 3D which is interfered with by sideband $Fu^{**}$ (second compensation).

At the same time, however, the upper sideband Fo in FIG. 3A, which is also interfered with, is converted through mixing by means of another suitable carrier, this time again with a change in polarity (sign) into the frequency position of the interfering sideband $Fu^{}$. This negative sideband $-Fo^{*}-Gu^{*}$ is heterodyned on the positive sideband $Fu^{}$ in FIG. 3D. The result is the upper sideband Co in FIG. 3E which is interfered with by the sideband $-Gu^{***}$ (third compensation).

However, at the same time the uninterfered with upper sideband Go in FIG. 3A is also converted through mixing by means of another suitable carrier, this time again without a change of polarity (sign), into the frequency position of the interfering sideband $-Gu^{*}$. This positive sideband $Go^{}$ in FIG. 3E is heterodyned with the sideband $-Gu^{*}$ with the negative polarity (sign). The result now is the largely undisturbed upper sideband Co in FIG. 3F (fourth compensation).

This is the upper sideband Wo of the double-sideband oscillation W to be evaluated, which can now be evaluated according to the principle of single-sideband reception (demodulation).

In the case of simultaneous filtering of both sidebands Wu and Wo of the double-sideband oscillation W, they can also be evaluated according to the principle of double-sideband reception (demodulation).

The circuit apparatus shown in FIG. 4 serves to perform, by means of the method explained in connection with FIG. 2, a successive compensation of interfering sidebands. In FIG. 4, each mixer Mi1, Mi2, Mi3, Mi4 has a primary input line and a separate attenuator A1, A2, A3, A4 connected to its first auxiliary input line. Each attenuator has one line of a separate frequency-separating network, e.g., the network comprised of W1, Q1, P1, connected thereto. And each mixer has another line of a respective frequency-separating network connected to its second auxiliary input line.

The arrangement contains the mixers Mi1 to Mi4. Again, it is assumed that an ensemble consists of a maximum of 7 double-sideband oscillations A, B, C, D, E, F, G. Then the circuit arrangement has to be set up for four compensations. The reason is: If the desired station lies directly in the middle of the ensemble, there is a demand for three compensations for both sides; if the desired station lies one channel off the middle (as, e.g., C), two compensations may be required for one side and four compensations for the other side; if the desired station were to lie two channels off the middle, one compensation could be considered for one side and five compensations for the other side; in the last-mentioned case, one would certainly select the side with only one compensation to eliminate the interference. Therefore, five compensations are never considered. Consequently, (in the case of seven assumed double-sideband oscillations of one ensemble), the assumed figure of a maximum of four compensations is the correct figure for the setup of the circuit arrangement.

Before the ensemble goes into the mixer Mi1, it must go through a low-pass filter TP1, where the frequency band is sharply cut off just above the upper end of the ensemble. The upper sideband of the double-sideband oscillation G must not be pared nor partially damped, nor be changed in the phase position of its upper edge oscillations. Otherwise the first compensation will not fully function, and its errors propagate in the other compensations.

On the other hand, the filter TP1, measured at the two passes otherwise necessary for single band reception (low-pass and high-pass, respectively, summarized as bandpass) does not represent any additional expense because the single-sideband low-pass filter that would otherwise be required outside of the circuit arrangement can be eliminated. The mixer Mi1 then receives the mix of the double-sideband oscillations, i.e. the ensemble containing the interfered with double-sideband oscillation of the desired transmitter.

In the following, the mixing processes are dealt with first written as a formula in amplitude notation instead of the plain analysis of the sidebands, in order to make sure that all considerations concerning signs and phase are correct and that the compensations actually take place. a to g denote amplitudes from A to G.

The ensemble M=A+B+C+D+E+F+G then reads:
$\hat{a} \sin(2\pi f_{TA}t+\gamma_{TA})$
$\hat{b} \sin(2\pi f_{TB}t+\gamma_{TB})$
$\hat{c} \sin(2\pi f_{TC}t+\gamma_{TC})$
$\hat{d} \sin(2\pi f_{TD}t+\gamma_{TD})$
$\hat{e} \sin(2\pi f_{TE}t+\gamma_{TE})$
$\hat{f} \sin(2\pi f_{TF}t+\gamma_{TF})$
$\hat{g} \sin(2\pi f_{TG}t+\gamma_{TG})$ The carrier oscillations read accordingly:
a $\sin(2\pi f_{TA}t+\gamma_{TA})$
b $\sin(2\pi f_{TB}t+\gamma_{TB})$
c $\sin(2\pi f_{TC}t+\gamma_{TC})$
d $\sin(2\pi f_{TD}t+\gamma_{TD})$
e $\sin(2\pi f_{TE}t+\gamma_{TE})$
f $\sin(2\pi f_{TF}t+\gamma_{TF})$
g $\sin(2\pi f_{TG}t+\gamma_{TG})$ If the double-sideband oscillation C is to be received largely free of interference, then either the following carrier oscillations—listed starting at the ensemble ends—must be fed into the circuit arrangement
a $\sin(2\pi f_{TA}t+\gamma_{TA})$
b $\sin(2\pi f_{TB}t+\gamma_{TB})$
or the carrier oscillations
g $\sin(2\pi f_{TG}t+\gamma_{TG})$
f $\sin(2\pi f_{TF}t+\gamma_{TF})$
e $\sin(2\pi f_{TE}t+\gamma_{TE})$
d $\sin(2\pi f_{TD}t+\gamma_{TD})$
which must be derived in advance. The frequency-precise and phase-correct collection of carrier oscillations is, according to the state of technology today, no longer a problem, and it is possible without substantial expenditure.

FIG. 4 illustrates the more complicated and extreme case, the compensation from G to D. By enabling a relevant frequency conversion (reversing)—not shown in the illustration—interference compensation can—with the same circuit arrangement—also be performed from the other side, via A and B, whereby the carrier oscillations
a $\sin(2\pi f_{TA}t+\gamma_{TA})$ und
b $\sin(2\pi f_{TB}t+\gamma_{TB})$
are to be fed in.

The carrier oscillations are first shifted forward by 90° in the phase shifters P1 to P4 (or they are all shifted back by 90°).

This phase shifting is necessary to have the respective mixing products appear with the opposite sign and compensate each other.

The phase-shifted carrier oscillations
g $\cos(2\pi f_{TG}t+\gamma_{TG})$
f $\cos(2\pi f_{TF}t+\gamma_{TF})$
e $\cos(2\pi f_{TE}t+\gamma_{TE})$
d $\cos(2\pi f_{TD}t+\gamma_{TD})$
are then squared in Q1 to Q4 from which the following oscillations emerge:

$$\frac{g^2}{2} \cos(2\pi 2 f_{TG}t + 2\phi_{TG}) + \frac{g^2}{2}$$

-continued
$$\frac{f^2}{2} \cos(2\pi 2 f_{TF}t + 2\phi_{TF}) + \frac{f^2}{2}$$

$$\frac{e^2}{2} \cos(2\pi 2 f_{TE}t + 2\phi_{TE}) + \frac{e^2}{2}$$

$$\frac{d^2}{2} \cos(2\pi 2 f_{TD}t + 2\phi_{TD}) + \frac{d^2}{2}$$

i.e., cosine oscillations of twice the carrier frequency and a doubled carrier phase angle which are accompanied by a DC component $$\frac{g^2}{2}, \frac{f^2}{2}, \frac{e^2}{2} \text{ oder } \frac{d^2}{2}$$

The DC component plays a special role in the mixing processes in mixers Mi1 to Mi4.

The DC components in frequency-separating networks W1 to W4 are separated from their oscillations and reduced to half their amount in adjustable attenuators A1 to A4, for instance, adjustable potentiometers. Consequently, the following mixing signals go into the mixers Mi1 to Mi4:

$$\frac{g^2}{2} \cos(2\pi 2 f_{TG}t + 2\phi_{TG}) + \frac{g^2}{4}$$

$$\frac{f^2}{2} \cos(2\pi 2 f_{TF}t + 2\phi_{TF}) + \frac{f^2}{4}$$

$$\frac{e^2}{2} \cos(2\pi 2 f_{TE}t + 2\phi_{TE}) + \frac{e^2}{4}$$

$$\frac{d^2}{2} \cos(2\pi 2 f_{TD}t + 2\phi_{TD}) + \frac{d^2}{4}$$

The attenuators are required for the following reason: The DC components, on the one hand, and the oscillations of twice the carrier frequency, on the other, have the task of generating products of the multiplication in the mixers, which cancel each other. The products can accomplish the latter only, however, if they not only have opposite signs but are equal in value. During the multiplication of an oscillation by an oscillation, a frequency upper and a frequency lower mixing product are formed according to the trigonometric formulas, each mixing product carrying the factor ½. In the case of a multiplication of an oscillation by a DC component, however, such halving does not take place. Therefore, in view of the compensation the DC component must be attenuated to half its value in advance, which, however, does not complicate the simplicity of the procedure according to the invention, because the frequency-separating networks as well as the attenuators are simple circuit elements.

Nor is high accuracy required of the squarers Q1 to Q4, if the DC component emitted by them deviates as compared to the amplitude of the created oscillation, this deviation can be balanced by means of the adjustable attenuators. Mixers can be used as squarers, into both inputs of which the carrier frequency oscillations are fed. However, squarers using analogue technique may be employed, i.e., common diode networks featured in an approximately parabola-shaped characteristic curve. Here, embodiments entailing little expenditure will suffice, since deviations from a mathematically exact squaring pertain equally to the DC components and the factor of proportionality of the oscillation. These deviations cancel each other during the compensation.

The mixers Mi1 to Mi4 are actually multipliers, i.e., due to the DC component mentioned previously they must work down to frequency zero insofar as one input is concerned. If in this context they are nevertheless called mixers it is because here also it does not matter whether the mixing DC component is impaired somewhat due to a possible frequency response. This, too, can be balanced by the adjustable attenuators which—it should be noted—need be set only once—during manufacture.

The mixer Mi1 provides a mixing product M* which, by applying the trigonometric equation: sine alpha cos beta=½ sine (alpha+beta)+½ sine (alpha−beta) consists of the partial products:
of the subsequent product of the double-sideband oscillation G, which is to be canceled $$\hat{g} \frac{g^2}{4} \sin(2\pi f_{TG}t + 2\pi 2 f_{TG}t + \phi_{TG} + 2\phi_{TG}) +$$

$$\hat{g} \frac{g^2}{4} \sin(2\pi f_{TG}t - 2\pi f 2_{TG}t + \phi_{TG} - 2\phi_{TG}) +$$

$$\hat{g} \frac{g^2}{4} \sin(2\pi f_{TG}t + \phi_{TG})$$

as well as of the subsequent product of the double-sideband oscillation C which, in the final analysis, is to be received $$\hat{c} \frac{g^2}{4} \sin(2\pi f_{TC}t + 2\pi 2 f_{TG}t + \phi_{TC} + 2\phi_{TG})$$

$$\hat{c} \frac{g^2}{4} \sin(2\pi f_{TC}t - 2\pi 2 f_{TG}t + \phi_{TC} - 2\phi_{TG})$$

$$\hat{c} \frac{g^2}{4} \sin(2\pi f_{TC}t + \phi_{TC})$$

as well as of the subsequent products of A, B, D, E, F analog C, whereby the indices TC must be substituted by the indices TA, TB, TD, TE, TF.

The first formula series for each must be eliminated, since—as will become clear after summarizing all partial products—the result is in all cases a mixing product with three fold or nearly three fold, the carrier frequency. The double-sideband oscillations mixed to that level, however, are completely beyond all low passes. In each of the second formula series the angle is recognized as negative. If this is done according to the equation sine (−alpha)=−sine alpha positive, the second equation series—physically its amplitude—receives a negative sign which, in turn, means: in the sideband presentation, the sidebands receive a negative sign.

Each of the third equation series is a reproduction of A, B, C, D, E, F, or G, generated by the DC component $g^2/4$.

In the case of the subsequent product of G, the desired cancellation of G is noted. The second and the third formula series are alike insofar as the formulae are concerned, in which case the second one has the desired negative sign, whereas the third represents the positive reproduction of G from the ensemble, to such reproduction we assigned the same factor of proportionality $g^2/4$ as a matter of precaution, by means of the mentioned attenuator.

FIG. 5 shows the mixing product M* as a spectrum in double-sideband presentation. One can see how:
1. the mixing of the ensemble reproduces the ensemble—as a consequence of the described mixing DC component,
2. the mixing of the ensemble creates a second, frequency-offset ensemble, more correctly: a "negatively reversed" ensemble—as a consequence of the described mixing cosine oscillation with double the carrier frequency of G,
3. in the mixing process both partial products heterodyne each other in the desired manner with the correct sign, i.e. they cancel each other.

"Negatively reversed" means: each oscillation with a frequency below $f_{TG}$ appears as a mirror image above $f_{TG}$ (the double-sideband oscillations). G and G* cancel each other in the process.

Before the mixing product M* goes into the mixer Mi2, the reflected ensemble must be separated by a low-pass\filter TP2 located between the double-sideband oscillations F and F*. However, due to the required low flank slope, this can be set up rather simply since, between F and F*, as can be seen in FIG. 5, there is a double channel spacing (e.g. 2×9 kHz=18 kHz) due to the cancellation of G by G*. Such double channel spacings also result, in the case of the subsequent mixings, between E and E* as well as between D and D*.

As a consequence of these doubled channel spacings the following advantageous situation exists: Even if the carrier frequency spacings of the double-sideband oscillations of the ensembles are not uniform and are distributed differently when receiving another ensemble, the low-pass filters, adjusted during production for the scattering width of the occurring carrier frequency distances, still function. There are also such non problematic low-pass filters, designated TP3 and TP4, before the mixers Mi3 and Mi4.

The mixing product M, now goes into the mixer Mi2. There, the same mixing processes take place as in Mi1, likewise in Mi3 and Mi4. The oscillation mix M**** coming from mixer Mi4 then consists only of the double-sideband oscillations A, B and C, in which case the upper sideband of C is now free of interference and can be evaluated in single-sideband reception. As is usual in this type of reception, the double-sideband oscillations A and B are separated by a high-pass filter (SSB high-pass) with the critical frequency $f_{TC}$.

The special advantage of the proposed circuit arrangement should be expressly mentioned: it functions even if the double-sideband oscillations have a non uniform carrier frequency spacing. And this happens very often in the short-wave range.

It has been stated previously that the elimination of interferences by means of mixing and overlaps eliminating interferences can be applied to the adjacent transmitter with the higher frequency as well as with the lower frequency. By taking both paths simultaneously one could, therefore, demodulate the desired transmitter as a double-sideband oscillation. Nevertheless, according to the present state of knowledge it can be recommended only to a limited degree since, otherwise, one receives the interference compensation errors of both sides, whereas in the case of single sideband reception the side with the lower error factor of interference compensation can have preference.

The original processes, designed for single sideband reception, can be generalized; there are many conceivable possibilities: the overlaps canceling the interferences can take place in the high frequency part, in the intermediate frequency parts or, also, in the low frequency part; the processes can also be performed, distributed between the different receiver parts, and mixings as well as demodulations my take place.

Pure forms of "simultaneous interference cancellation" and of "successive interference cancellation" as well as mixed forms are possible. Here there are elegant solutions for which—as in the described circuit arrangement, in addition to the required passes for the single sideband reception—no low-pass filters, high-pass filters, or band pass filters are necessary, and there are others where pass filters or a higher number of mixings are required.

While the principles of the invention have been described in connection with only a few preferred embodiments, these are exemplary and not limiting.

What is claimed:

1. In an ensemble comprising a mixture of several double-sideband modulated signals including (a) an upper signal at the upper end of the ensemble, such upper signal having an interference-free upper sideband (b) a lower signal at the lower end of the ensemble, such lower signal having an interference-free lower sideband, and (c) an intermediate signal to be received between the upper and lower ends of the ensemble, and wherein:

each modulated signal has a different carrier frequency;

each of the sidebands of the intermediate signal is overlapped and being interfered with by a sideband of another signal; and it is desired, in order to receive by single-sideband reception the upper sideband of the intermediate signal, a method to eliminate interference with the upper sideband of the intermediate signal including the step of:

applying an anti-interference compensation to the sideband interfering with the upper sideband of the intermediate signal, whereby the upper sideband of the intermediate signal is made substantially interference-free.

2. The method of claim 1 wherein the applying step includes the steps of:

A. changing the upper sideband of the upper signal to an inverted position;

B. changing the algebraic sign of the inverted upper sideband of the upper signal to provide the anti-interference compensation;

C. combining the anti-interference compensation with a mixture of the upper sideband of the intermediate signal and the sideband interfering with the upper sideband of the intermediate signal, thereby obtaining another interference-free upper sideband; and D. repeating the steps of A, B and C to the extent necessary to make the upper sideband of the intermediate signal substantially interference-free.

3. The method of claim 2 wherein steps A, B, C and D are carried out sequentially in step-by-step fashion.

4. The method of claim 2 wherein steps A, B, C and D are carried out substantially simultaneously.

5. In an ensemble comprising a mixture of several double-sideband modulated signals including (a) an upper signal at the upper end of the ensemble, such upper signal having an interference-free upper sideband (b) a lower signal at the lower end of the ensemble, such lower signal having an interference-free lower sideband, and (c) an intermediate signal to be received between the upper and lower ends of the ensemble, and wherein:

each modulated signal has a different carrier frequency;

each of the sidebands of the intermediate signal is overlapped and being interfered with by a sideband of another signal; and it is desired, in order to receive by single-sideband reception the lower sideband of the intermediate signal, a method to eliminate interference with the lower sideband of the intermediate signal including the step of:

applying an anti-interference compensation to the sideband interfering with the lower sideband of the intermediate signal, whereby the lower sideband of the intermediate signal is made substantially interference-free.

6. The method of claim 5 wherein the applying step includes the steps of:

A. changing the lower sideband of the lower signal to an inverted position;

B. changing the algebraic sign of the inverted lower sideband of the lower signal to provide the anti-interference compensation;

C. combining the anti-interference compensation with a mixture of the lower sideband of the intermediate signal and the sideband interfering with the lower sideband of the intermediate signal, thereby obtaining another interference-free lower sideband; and D. repeating the steps of A, B and C to the extent necessary to make the lower sideband of the intermediate signal substantially interference-free.

7. The method of claim 6 wherein steps A, B, C and D are carried out sequentially in step-by-step fashion.

8. The method of claim 6 wherein steps A, B, C and D are carried out substantially simultaneously.

9. In an ensemble comprising a mixture of several double-sideband modulated signals including (a) an upper signal at the upper end of the ensemble, such upper signal having an interference-free upper sideband (b) a lower signal at the lower end of the ensemble, such lower signal having an interference-free lower sideband, and (c) an intermediate signal to be received between the upper and lower ends of the ensemble, and wherein:

each modulated signal has a different carrier frequency;

each of the sidebands of the intermediate signal is overlapped and being interfered with by a sideband of another signal; and it is desired, in order to receive by double-sideband reception both sidebands of the intermediate signal, a method to eliminate interference with both sidebands of the intermediate signal including the steps of:

A. changing the upper sideband of the upper signal to an inverted position;

B. changing the algebraic sign of the inverted upper sideband of the upper signal to provide an anti-interference compensation;

C. combining the anti-interference compensation with a mixture of the upper sideband of the intermediate signal and the sideband interfering with the upper sideband of the intermediate signal, thereby obtaining another interference-free upper sideband;

D. repeating the steps of A, B and C to the extent necessary to make the upper sideband of the intermediate signal substantially interference-free;

E. changing the lower sideband of the lower signal to an inverted position;

F. changing the algebraic sign of the inverted lower sideband of the lower signal to provide a second anti-interference compensation;

G. combining the second anti-interference compensation with a mixture of the lower sideband of the intermediate signal and the sideband interfering with the lower sideband of the intermediate signal, thereby obtaining another interference-free lower sideband; and H. repeating the steps of A, B and C to the extent necessary to make the lower sideband of the intermediate signal substantially interference-free; and I. adding the upper and lower sidebands of the intermediate signal.

10. The method of claim 9 wherein the steps are carried out sequentially in step-by-step fashion.

11. The method of claim 9 wherein steps A, B, C and D are carried out substantially simultaneously.

12. A circuit arrangement for carrying out the method of claim 3, i.e., for providing a substantially interference-free upper sideband of a double-sideband oscillation to be evaluated, the arrangement including:

first, second, third and fourth mixer/filter sections in series, each mixer/filter section including a mixer preceded by a low-pass filter;

and wherein:

each mixer has a primary input line and first and second input lines;

each mixer of each mixer/filter section has a separate attenuator connected to its first input line;

each attenuator has one line of a separate frequency-separating network connected thereto;

each mixer has another line of the respective separate frequency-separating network connected to its second input line;

each frequency-separating network has a separate squarer connected thereto;

each squarer has a separate phase shifter connected thereto;

and wherein:

the phase shifters feeding the first, second, third and fourth mixer/filter sections are identified as P1, P2, P3 and P4, respectively;

the phase shifters P1, P2, P3, P4 have inputted thereto the carriers of double-sideband oscillations G, F, E and D, respectively;

the oscillations G, F, E and D are in descending order of frequency and each oscillation G, F, E and D has a carrier frequency greater than the carrier frequency of the double-sideband oscillation to be evaluated;

the low-pass filter of the first mixer/filter section has a critical frequency identical to the highest frequency of the upper sideband of the oscillation G;

the low-pass filter of the second mixer/filter section has a critical frequency identical to the carrier frequency of the oscillation F;

the low-pass filter of the third mixer/filter section has a critical frequency identical to the carrier frequency of the oscillation E;

the low-pass filter of the fourth mixer/filter section has a critical frequency identical to the carrier frequency of the oscillation D;

the low-pass filter of the first mixer/filter section has inputted thereto an ensemble of double-sideband oscillations, such ensemble including the double-sideband oscillation to be evaluated;

each frequency-separating network is configured to filter out the DC component of the squared carrier inputted to that network and direct such component to that attenuator connected to such network;

each attenuator is configured to reduce such component by about one-half and direct such reduced component to the first input line of the respective mixer connected thereto; and each frequency-separating network is further configured to direct the squared carrier received from its respective squarer to the second input line of the respective mixer connected to such network;

and wherein:

the mixer of the fourth mixer/filter section has an output line having available thereon the substantially interference-free upper sideband of the double-sideband oscillation to be evaluated.

13. The circuit arrangement of claim 12 wherein each mixer of the first, second, third and fourth mixer/filter sections is embodied as a multiplier.

14. A circuit arrangement for carrying out the method of claim 3, i.e., for providing a substantially interference-free upper sideband of a double-sideband oscillation to be evaluated, the arrangement including:

first, second, third and fourth filter/summing sections connected in series, each filter/summing section including a low-pass filter and a summing device connected in series, each summing device having an output line, each filter/summing section also including a junction between the low-pass filter and the summing device;

a separate input circuit connected to each filter/summing section, each input circuit including a separate squarer Q1, Q2, Q3 and Q4, respectively, the squarers Q1, Q2, Q3 and Q4 having inputted thereto the carriers of double-sideband oscillations G, F, E and D, respectively;

a separate amplitude stabilizer connected to each of the respective squarers, a separate attenuator connected to each of the respective amplitude stabilizers and a separate mixer connected to each of the respective attenuators;

each mixer receiving a signal from the junction of its respective filter/summing section, each mixer outputting a signal to the respective summing device;

and wherein:

the low-pass filter of the first filter/summing section has a critical frequency identical to the highest frequency of the upper sideband of the oscillation G;

the low-pass filter of the second filter/summing section has a critical frequency identical to the carrier frequency of the oscillation F;

the low-pass filter of the third filter/summing section has a critical frequency identical to the carrier frequency of the oscillation E;

the low-pass filter of the fourth filter/summing section has a critical frequency identical to the carrier frequency of the oscillation D;

the low-pass filter of the first filter/summing section has inputted thereto an ensemble of double-sideband oscillations, such ensemble including the double-sideband oscillation to be evaluated;

and wherein:

the output line of the summing device of the fourth filter/summing section has available thereon the substantially interference-free upper sideband of the double-sideband oscillation to be evaluated.

15. A circuit arrangement for carrying out the method of claim 3, i.e., for providing a substantially interference-free upper sideband of a double-sideband oscillation to be evaluated, the arrangement including:

first, second, third and fourth filter/summing sections connected in series, each filter/summing section including a low-pass filter and a summing device connected in series, each summing device having an output line, each filter/summing section also including a junction between the low-pass filter and the summing device;

a separate input circuit connected to each filter/summing section, each input circuit including (a) a separate regulator Re1, Re2, Re3 and Re4, respectively, and (b) a separate variable-gain amplifier RV1, RV2, RV3 and RV4, respectively;

each amplifier RV1, RV2, RV3 and RV4 is connected to a separate squarer Q1, Q2, Q3 and Q4, respectively, and is also connected to a separate mixer Mi1, Mi2, Mi3 and Mi4, respectively;

the squarers Q1, Q2, Q3 and Q4 which have inputted thereto the carriers of double-sideband oscillations G, F, E and D, respectively;

and wherein:

each regulator Re1, Re2, Re3 and Re4 is connected (a) to the output line of a separate summing device, (b) to the input line of such separate summing device and (c) to a separate amplifier;

and wherein:

the low-pass filter of the first filter/summing section has a critical frequency identical to the highest frequency of the upper sideband of the oscillation G;

the low-pass filter of the second filter/summing section has a critical frequency identical to the carrier frequency of the oscillation F;

the low-pass filter of the third filter/summing section has a critical frequency identical to the carrier frequency of the oscillation E;

the low-pass filter of the fourth filter/summing section has a critical frequency identical to the carrier frequency of the oscillation D;

the low-pass filter of the first filter/summing section has inputted thereto an ensemble of double-sideband oscillations, such ensemble including the double-sideband oscillation to be evaluated;

and wherein:

the output line of the summing device of the fourth filter/summing section has available thereon the substantially interference-free upper sideband of the double-sideband oscillation to be evaluated.

16. The circuit arrangement of claim 15 wherein:

each of the regulators Re1, Re2, Re3 and Re4 includes two multiplying devices Mu2, Mu1;

the multiplying devices Mu2, Mu1 receive signals available, respectively, preceding and following a respective summing device, each such multiplying device demodulating such signals and providing an output signal;

each regulator Re1, Re2, Re3 and Re4 also including a third multiplying device Mu3 accepting signals from the multiplying devices Mu2 and Mu1 and multiplying such accepted signals together to produce a multiplied output;

a low-pass filter receiving the multiplied output from the device Mu3; and a time function element PI receiving the output of the low-pass filter and providing an actuating value for use in the arrangement.

* * * * *

UNITED STATES PATENT AND TRADEMARK OFFICE
CERTIFICATE OF CORRECTION

PATENT NO.    : 5,603,110
DATED         : February 11, 1997
INVENTOR(S)   : Gustav Heinzamann It is certified that error appears in the above-identified patent and that said Letters Patent is hereby corrected as shown below:

In column 9, line 35, delete "-Bu" and insert -- -Bu*--.

In column 9, line 50, delete "-Go," and insert -- -Go* --.

In column 13, line 1, delete "Mil" and insert --Mil--.

In column 13, line 9, delete "a to g" and insert --â to ĝ--.

In column 13, lines 12-18, 20-26, 31-32, 34-37, 48-49 and 58-61 delete " γ " and insert -- φ --.

In column 16, line 2, delete the "\" between pass and filter.

In column 16, line 21, delte "M," and insert --M*--.

In column 16, line 56, delete "my" and insert --may--.

Signed and Sealed this

Sixteenth Day of September, 1997

Attest:

BRUCE LEHMAN

*Attesting Officer*    *Commissioner of Patents and Trademarks*